(12) United States Patent
Dong et al.

(10) Patent No.: US 10,808,782 B2
(45) Date of Patent: Oct. 20, 2020

(54) FRICTION MATERIAL

(71) Applicant: BorgWarner Inc., Auburn Hills, MI (US)

(72) Inventors: Feng Dong, Rochester, MI (US); Robert Lam, Rochester, MI (US); Deanna Higgins, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 136 days.

(21) Appl. No.: 16/067,399

(22) PCT Filed: Dec. 23, 2016

(86) PCT No.: PCT/US2016/068480
§ 371 (c)(1),
(2) Date: Jun. 29, 2018

(87) PCT Pub. No.: WO2017/117038
PCT Pub. Date: Jul. 6, 2017

(65) Prior Publication Data
US 2019/0011006 A1   Jan. 10, 2019

Related U.S. Application Data
(60) Provisional application No. 62/387,654, filed on Dec. 30, 2015.

(51) Int. Cl.
F16D 13/64 (2006.01)
F16D 69/02 (2006.01)

(52) U.S. Cl.
CPC .......... *F16D 69/026* (2013.01); *F16D 13/64* (2013.01); *F16D 2200/0091* (2013.01); *F16D 2250/0069* (2013.01)

(58) Field of Classification Search
CPC . F16D 69/026; F16D 13/64; F16D 2250/0069
See application file for complete search history.

(56) References Cited

U.S. PATENT DOCUMENTS

| | | | | |
|---|---|---|---|---|
| 5,639,804 A | * | 6/1997 | Yesnik | C08L 61/06 523/156 |
| 5,707,905 A | * | 1/1998 | Lam | B05D 3/02 442/101 |

(Continued)

FOREIGN PATENT DOCUMENTS

| | | |
|---|---|---|
| CN | 1500850 A | 6/2004 |
| CN | 1603379 A | 4/2005 |

(Continued)

OTHER PUBLICATIONS

International Search Report for Application No. PCT/US2016/068480 dated Apr. 10, 2017, 5 pages.

(Continued)

Primary Examiner — Stacey A Fluhart
(74) Attorney, Agent, or Firm — Howard & Howard Attorneys PLLC

(57) ABSTRACT

A friction material includes a base, a deposit including a friction modifier, and a resin disposed throughout the friction material. The base includes aramid fibers present in an amount of from greater than 50 weight percent to 70 weight percent, based on a total weight of the base. The base also includes a filler present in an amount from 30 weight percent to less than 50 weight percent, based on a total weight of the base. The friction material is also free of a material having a thermal degradation temperature of less than 200° C. The friction material may have a porosity of from 60% to 85% as determined using ASTM D4404-10 and a median pore size of from 0.5 μm to 50 μm, as determined using ASTM D4404-10.

20 Claims, 9 Drawing Sheets

(56) References Cited

U.S. PATENT DOCUMENTS

| | | | |
|---|---|---|---|
| 5,753,356 A | | 5/1998 | Lam et al. |
| 5,858,883 A | * | 1/1999 | Lam .................. C04B 30/02 |
| | | | 427/386 |
| 5,998,307 A | | 12/1999 | Lam et al. |
| 6,194,059 B1 | | 2/2001 | Yesnik |
| 6,630,416 B1 | | 10/2003 | Lam et al. |
| 6,716,314 B2 | | 4/2004 | Johnson et al. |
| 6,875,711 B2 | | 4/2005 | Chen et al. |
| 7,090,746 B2 | | 8/2006 | Petschauer et al. |
| 8,021,744 B2 | | 9/2011 | Lam et al. |
| 8,394,452 B2 | * | 3/2013 | Dong .................. F16D 69/023 |
| | | | 427/226 |
| 8,951,763 B2 | | 2/2015 | Kim et al. |
| 2004/0033341 A1 | * | 2/2004 | Lam .................. F16D 69/026 |
| | | | 428/143 |
| 2005/0064778 A1 | | 3/2005 | Lam et al. |
| 2005/0075021 A1 | | 4/2005 | Lam et al. |
| 2005/0075022 A1 | * | 4/2005 | Lam .................. F16D 69/026 |
| | | | 442/97 |
| 2005/0075413 A1 | | 4/2005 | Lam |
| 2005/0075414 A1 | | 4/2005 | Lam et al. |
| 2006/0008635 A1 | | 1/2006 | Dong et al. |
| 2006/0241207 A1 | * | 10/2006 | Lam .................. C08J 5/04 |
| | | | 523/149 |
| 2010/0304631 A1 | * | 12/2010 | Dong .................. F16D 69/023 |
| | | | 442/181 |
| 2011/0189460 A1 | * | 8/2011 | Chavdar .............. F16D 69/026 |
| | | | 428/292.1 |
| 2012/0108698 A1 | * | 5/2012 | Lam .................. F16D 69/026 |
| | | | 523/156 |
| 2013/0037373 A1 | * | 2/2013 | Dong .................. F16D 69/026 |
| | | | 192/107 M |
| 2014/0225310 A1 | | 8/2014 | Yaguchi et al. |
| 2015/0031787 A1 | * | 1/2015 | Bares .................. F16D 69/026 |
| | | | 523/156 |

FOREIGN PATENT DOCUMENTS

| | | |
|---|---|---|
| CN | 1624356 A | 6/2005 |
| CN | 1699799 A | 11/2005 |
| CN | 1721176 A | 1/2006 |
| CN | 103038335 A | 4/2013 |
| EP | 1203897 A1 | 5/2002 |
| EP | 1521001 A2 | 4/2005 |

OTHER PUBLICATIONS

Engineered Fibers Technology, "EFTec Nanofibrillated Fibers", 2015, 3 pages.

Keyence, "Keyence TV Webpage and Video", https://www.keyence.com/keyence-tv/VK-X200_3D_Laser_Scanning_Microscope.jsp, 1 page.

Onyx Papers, "Onyx Papers Webpage", 2016, http://onyxpapers.com, 3 pages.

English language abstract for CN 1500850 extracted from espacenet.com database on Feb. 24, 2020, 1 page.

English language abstract for CN 1603379 extracted from espacenet.com database on Feb. 24, 2020, 1 page.

English language abstract for CN 1624356 extracted from espacenet.com database on Feb. 24, 2020, 1 page.

English language abstract and machine-assisted English translation for CN 1699799 extracted from espacenet.com database on Feb. 24, 2020, 4 pages.

English language abstract for CN 1721176 extracted from espacenet.com database on Feb. 24, 2020, 1 page.

English language abstract for CN 103038335 extracted from espacenet.com database on Feb. 24, 2020, 1 page.

* cited by examiner

FRICTION MATERIAL

CROSS-REFERENCE TO RELATED APPLICATIONS

The present application is the National Stage of International Patent Application No. PCT/US2016/068480, filed Dec. 23, 2016, which claims priority to and all the benefits of U.S. Provisional Patent Application No. 62/387,654, filed on Dec. 30, 2015, which are hereby expressly incorporated herein by reference in their entirety.

FIELD OF THE DISCLOSURE

This disclosure generally relates to a friction material that includes a base including fibers and a filler, a deposit including a friction modifier, and a resin disposed throughout the friction material. More specifically, the friction material can be used in a friction plate in a clutch assembly in a transmission.

BACKGROUND

Several components of a motor vehicle powertrain may employ a wet clutch to facilitate the transfer of power from the vehicle's power generator (i.e., an internal combustion engine, electric motor, fuel cell, etc.) to drive the wheels. A transmission located downstream from the power generator and which enables vehicle launch, gear shifting, and other torque transfer events is one such component. Some form of a wet clutch may be found throughout many different types of transmissions currently available for motor vehicle operation. A wet clutch may be utilized in a torque converter for an automatic transmission, a multi-plate wet clutch pack for an automatic transmission or a semi-automatic dual-clutch transmission (DCT), and a wet start clutch that may be incorporated into a sportier automatic transmission equipped with as many as seven to nine gears as a substitute for the torque converter, to name but a few examples. Similar wet clutches may be found elsewhere in the vehicle powertrain besides the transmission.

A wet clutch is an assembly that interlocks two or more opposed, rotating surfaces in the presence of a lubricant by imposing selective interfacial frictional engagement between those surfaces. A friction clutch plate, a band, a synchronizer ring, or some other part that provides one of these engageable rotating surfaces typically supports a friction material to effectuate the intended interlocking frictional engagement. The presence of the lubricant at the friction interface cools and reduces wear of the friction material and permits some initial slip to occur so that torque transfer proceeds gradually, although very quickly, in an effort to avoid the discomfort that may accompany an abrupt torque transfer event (i.e., shift shock). However, maintaining the lubricant at the friction interface has an adverse impact on fuel efficiency. This is because the power needed to pump the lubricant, usually under pressure, to and from the friction interface at a flow rate that keeps the surface of the friction material below a certain temperature is ultimately siphoned from the power generator.

In many applications, transmission and torque-on-demand systems incorporate slip clutches mainly for the fuel efficiency and driving comfort. The role of a slip clutch within these systems varies from vehicle launching devices, such as wet start clutches, to that of torque converter clutches. According to the operating conditions, the slip clutch can be differentiated into three principle classes: (1) Low Pressure and High Slip Speed Clutch, such as wet start clutch; (2) High Pressure and Low Slip Speed Clutch, such as Converter Clutch; and (3) Extreme Low Pressure and Low Slip Speed Clutch, such as neutral to idle clutch.

The principal performance concerns for most slip clutch applications are the prevention of shudder and the energy management of the friction material. The occurrence of shudder can be attributed to many factors including the friction characteristics of the friction material, the mating surface's hardness and roughness, oil film retention, lubricant chemistry and interactions, clutch operating conditions, driveline assembly and hardware alignment, and driveline contamination. Energy management is primarily concerned with controlling temperature of the friction material and may be affected by the pump capacity, oil flow path and control strategy.

New and advanced transmission systems are being developed by the automotive industry. These new systems often involve high energy requirements. Therefore, the technology of friction materials must be also developed to meet the increasing energy requirements of these advanced systems. In particular, a new high energy type friction material is needed. The new high energy friction material typically must be able to withstand high speeds wherein surface speeds are up to 65 m/seconds. Also, the friction material typically must be able to withstand high facing lining pressures up to 1500 psi. It may also be important that the friction material be useful under limited lubrication conditions.

In many applications, the friction material must be durable and have high heat resistance in order to be useful in the advanced transmission systems. Typically, the friction material must also remain stable at high temperatures and be able to rapidly dissipate the high heat that is being generated during operating conditions.

Conventional friction materials generally cannot function reliably at surface temperatures above 300-350° C. which may result from high surface speeds. Above those temperatures, such friction materials tend to suffer from material degradation and/or lubricant thermal degradation and glazing, which is a process in which the surface of the friction material accumulates thermally degraded lubricant additives to form a substantially impenetrable sludge deposit. Thermal material degradation results in a loss of material strength and durability and often causes high wear in many applications. A surface-glazed friction material may contribute to a variety of complications including shuddering and an inconsistent coefficient of friction across the friction interface. The amount of the lubricant that needs to be circulated over the friction material to sustain a low enough surface temperature depends on the configuration of the wet clutch and the surface area of the friction interface between the opposed, rotating surfaces.

Previously, asbestos fibers were included in friction materials for temperature stability. Due to health and environmental problems, asbestos is no longer used. More recent friction materials have attempted to overcome the absence of the asbestos in the friction material by modifying impregnated material or fibers with phenolic or phenolic-modified resins. These friction materials have a tendency to not rapidly dissipate the high heat generated, and may not have the necessary heat resistance and satisfactory high coefficient of friction performance now needed for use in the high speed systems currently being developed.

The high speeds that are typically generated during engagement and disengagement of the new transmission systems usually require that the friction material be able to maintain a relatively constant friction throughout engagement, i.e., frictional engagement. It may also be important that the frictional engagement be relatively constant over a wide range of speeds and temperatures in order to minimize "shuddering".

It may also be important that the friction material have a desired torque curve shape so that during frictional engagement the friction material is noise or "squawk" free. For example, in a torque curve, if the torque is greater at the end of the curve than the beginning, then shudder is likely to occur. On the contrary, if the torque curve is greater that the beginning of the curve than the end, then shudder is unlikely. Minimized torque "fade" over many cycles is desirable. In view of the above, there remains an opportunity to develop an improved friction material.

BRIEF DESCRIPTION OF THE FIGURES

Other advantages of the present invention will be readily appreciated, as the same becomes better understood by reference to the following detailed description when considered in connection with the accompanying drawings. The individual components in one or more of the drawings may not be shown to scale.

SUMMARY OF THE DISCLOSURE

A friction material includes a base, a deposit including a friction modifier, and a resin disposed throughout the friction material. The base includes aramid fibers present in an amount of from greater than 50 weight percent to 70 weight percent, based on a total weight of the base. The base also includes a filler present in an amount from 30 weight percent to less than 50 weight percent, based on a total weight of the base. The friction material is also free of a material having a thermal degradation temperature of less than 200° C.

In one embodiment, this disclosure provides a friction material that defines pores each having a pore size. For example, the friction material may have a porosity of from 60% to 85% as determined using ASTM D4404-10 and a median pore size of from 0.5 µm to 50 µm, as determined using ASTM D4404-10.

DETAILED DESCRIPTION OF THE DISCLOSURE

Figure 9:
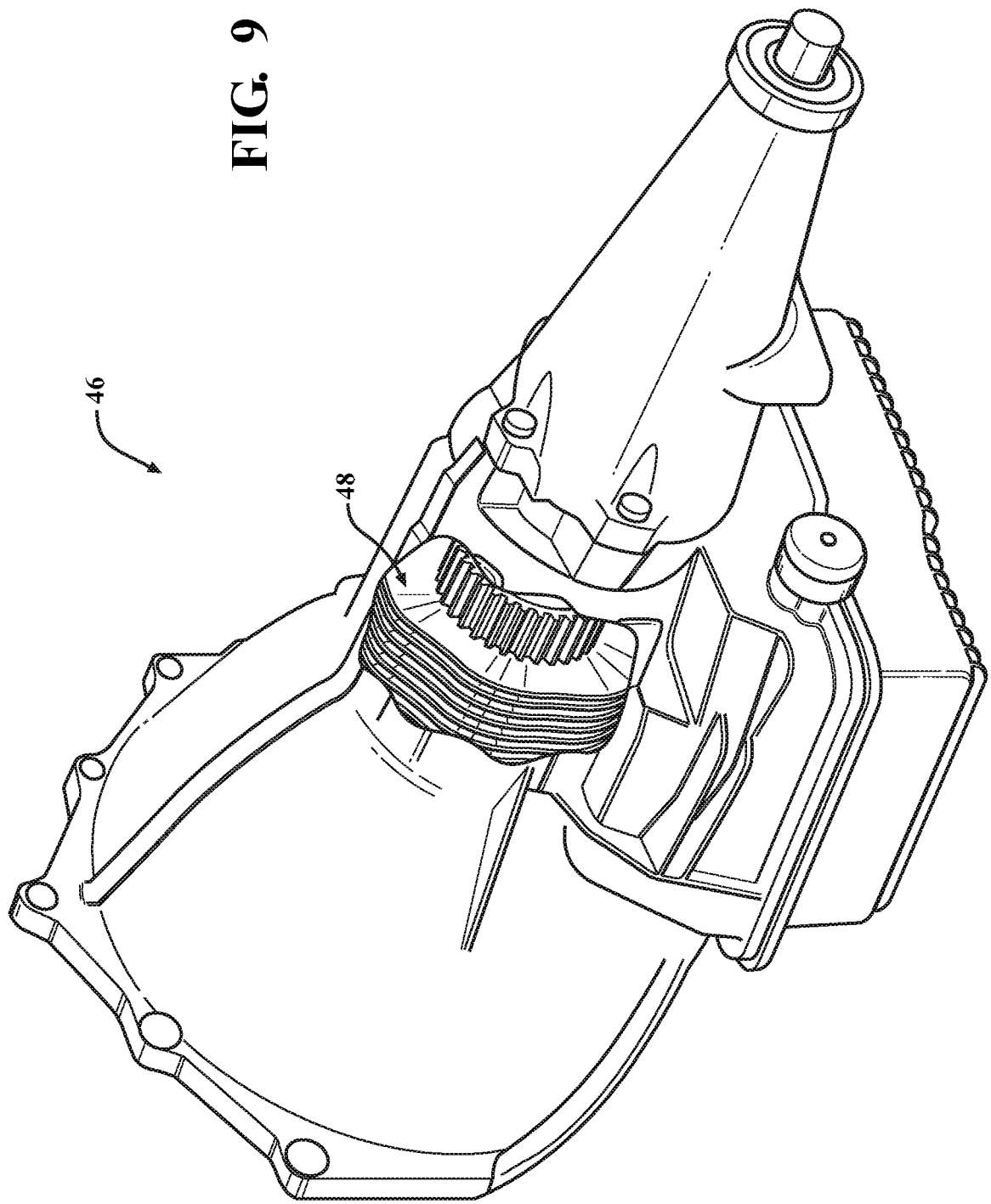
FIG. 9 is a perspective view of a transmission having a cut-out showing a clutch assembly.

The subject disclosure includes a friction material (10) and a friction plate (30) including the friction material (10). The friction material (10) described herein is typically used on a friction plate (30) which can be, for example, included in a wet clutch assembly in a transmission (46) of a motor vehicle. In other words, the friction material (10) is typically designed to be adhered to a substrate (32), such as a steel plate, to form a friction plate (30), as is known in the art. The metal plate has two surfaces and the friction material (10) may be adhered to one of both of these surfaces, e.g. with any adhesive known in the art. The friction plate (30) may be used, sold, or provided with a separator plate to form a clutch pack or clutch assembly (48), e.g. as shown in FIG. 9. It is to be appreciated that the friction material (10) and friction plate (30) described herein can be used in other vehicular applications and has applications beyond motor vehicles.

Friction Material:

The friction material (10) includes a base (12), a deposit (14) including a friction modifier (22), and a resin (26/34) disposed throughout the friction material (10). Each of these is described in greater detail below. The friction material (10) may be described as single-ply, meaning that it is a single layer and is not two (2)-ply. In other words, the friction material (10) does not include two distinct layers as would be present in a two-ply structure.

Base:

As shown in FIGS. 1-4, the friction material (10) includes the base (12). The base (12) may be alternatively described as a base layer, as a primary layer, or as a porous layer. If a layer, the layer is typically not discrete and well defined relative to edges and/or demarcation. Instead, the layer is typically indiscrete and may blend into the deposit (14), as described in greater detail below. For example, the layer may blend into the deposit (14) in a gradient type of pattern. Alternatively, the deposit (14) may blend into the base (12) in a gradient type of pattern.

The total thickness of the base (12) ($T_2$) is typically from 0.3 to 1, e.g. 0.3 to 0.9, 0.4 to 0.8, 0.5 to 0.7, 0.6 to 0.7, or 0.6 to 0.75, mm. In additional non-limiting embodiments, all values and ranges of values within and including the aforementioned range endpoints are hereby expressly contemplated. This thickness may refer to a thickness prior to, or after, bonding to the metal plate. In additional non-limiting embodiments, all values and ranges of values within and including the aforementioned range endpoints are hereby expressly contemplated.

Aramid Fibers:

As shown in FIGS. 1-4, the base (12) includes aramid fibers (20), i.e., fibers that include, or are, aramids. The aramid fibers (20) may have diameters from 1 µm to 500 µm and lengths from 2 mm to 20 mm. The fibers may be woven, non-woven, or any other suitable construction. In additional non-limiting embodiments, all values and ranges of values within and including the aforementioned range endpoints are hereby expressly contemplated. The fibers (20) may be alternatively described as a plurality of fibers (20).

The aramid fibers (20) present in an amount of greater than 50 weight percent to 70 weight percent, based on a total weight of the base (12). In various embodiments, the aramid fibers (20) are present in an amount of from 51 to 69, 52 to 68, 53 to 67, 54 to 66, 55 to 65, 56 to 64, 57 to 63, 58 to 62, 59 to 61, 51 to 65, 51 to 60, 51 to 55, 55 to 70, 55 to 65, 55 to 60, 60 to 70, 60 to 65, or 65 to 70, weight percent based on a total weight of the base (12). In additional non-limiting embodiments, all values and ranges of values within and including the aforementioned range endpoints are hereby expressly contemplated.

The aramid fibers (20) are not particularly limited and may be any known in the art. For example, the aramid fibers (20) may be further defined as, be, include, consist of, or consist essentially of, AB homopolymers, AABB polymers, etc. As is known in the art, aramids are generally prepared by the reaction between an amine group and a carboxylic acid halide group. Simple AB homopolymers may look like nNH$_2$—Ar—COCl→—(NH—Ar—CO)$_n$—+nHCl. Various non-limiting examples of aramids include Kevlar, Twaron, Nomex, New Star and Teijinconex, which are AABB polymers. Nomex, Teijinconex and New Star include predominantly meta-linkages and are poly-metaphenylene isophthalamides (MPIA). Kevlar and Twaron are both p-phenylene terephthalamides (PPTA), the simplest form of the AABB para-polyaramide. PPTA is a product of p-phenylene diamine (PPD) and terephthaloyl dichloride (TDC or TCl). One or more types of aramids can be used. In one embodiment, the aramid is poly-paraphenylene terephthalamide. In another embodiment, the aramid is or includes two or more types of aramids, e.g. a first poly-paraphenylene terephthalamide and a second poly-paraphenylene terephthalamide that is different from the first. In one embodiment, Twaron products are used. In other embodiments, Kevlar is used. In still other embodiments, other aramids are used. The total weight percent of the aramid fibers (20) is as described above. In various embodiments, when two or more aramids are used, each of the aramids may be present in any amount from 1 to 70 weight percent, so long as the total weight of all aramids used is from greater than 50 weight percent to 70 weight percent, based on a total weight of the base (12). For example, any one or more individual aramids may be utilized in an amount of 1, 5, 10, 15, 20, 25, 30, 35, 40, 45, 50, 55, 60, 65, or 70 weight percent based on a total weight of the base (12). In some embodiments, two aramids are used wherein a first aramid is used in an amount of from 5 to 50, 10 to 45, 15 to 40, 20 to 35, 35 to 30, 20 to 40, 20 to 35, 20 to 30, 20 to 25, 25 to 40, 25 to 35, 25 to 30, weight percent based on a total weight of the base (12), and a second aramid is used in a balance amount such that the total weight percent of the aramids is from greater than 50 weight percent to 70 weight percent, based on a total weight of the base (12), as described above. In additional non-limiting embodiments, all values and ranges of values within and including the aforementioned range endpoints are hereby expressly contemplated In various embodiments, the aramid fibers (20) have a length from 0.5 to 10 mm and a Canadian Standard Freeness (CSF) of greater than 300. In other embodiments, less fibrillated aramid fibers (20) are utilized which have a CSF of 450 to 550, e.g. from 530 to 550. In other embodiments, the aramid fibers (20) have CSF of 580 to 650 or greater than 650. In contrast, more fibrillated fibers, such as aramid pulp, have a freeness of 285-290. In additional non-limiting embodiments, all values and ranges of values within and including the aforementioned range endpoints are hereby expressly contemplated.

The terminology "Canadian Standard Freeness" (T227 om-85) describes that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, less fibrillated aramid fibers (20) have higher freeness or higher rate of drainage of fluid from the friction material (10) than other aramid fibers (20) or pulp. Friction materials (10) including aramid fibers (20) having a CSF from 430 to 650 can provide superior friction performance and have better material properties than friction materials (10) including more fibrillated aramid fibers (20). Longer fiber length, together with high Canadian Standard Freeness, tend to provide a friction material (10) with high porosity and good wear resistance. Less fibrillated aramid fibers (20) (CSF of 530 to 650) may exhibit good long-term durability and stable coefficients of friction.

It is also contemplated that other fibers may be utilized, such as acrylic fibers. For example, the acrylic fibers may be, or be formed from, one or more synthetic acrylic polymers such as those formed from at least 85% by weight acrylonitrile monomers.

Figure 1:
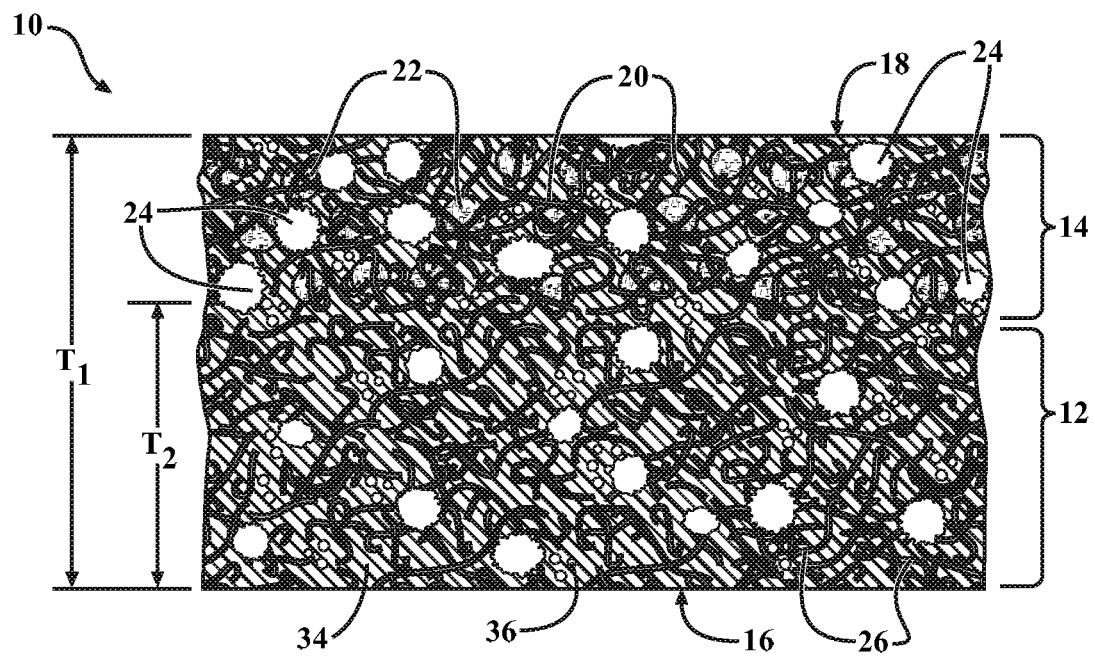
FIG. 1 is a cross-sectional view of one embodiment of a friction material including a base and a deposit.
Figure 2:
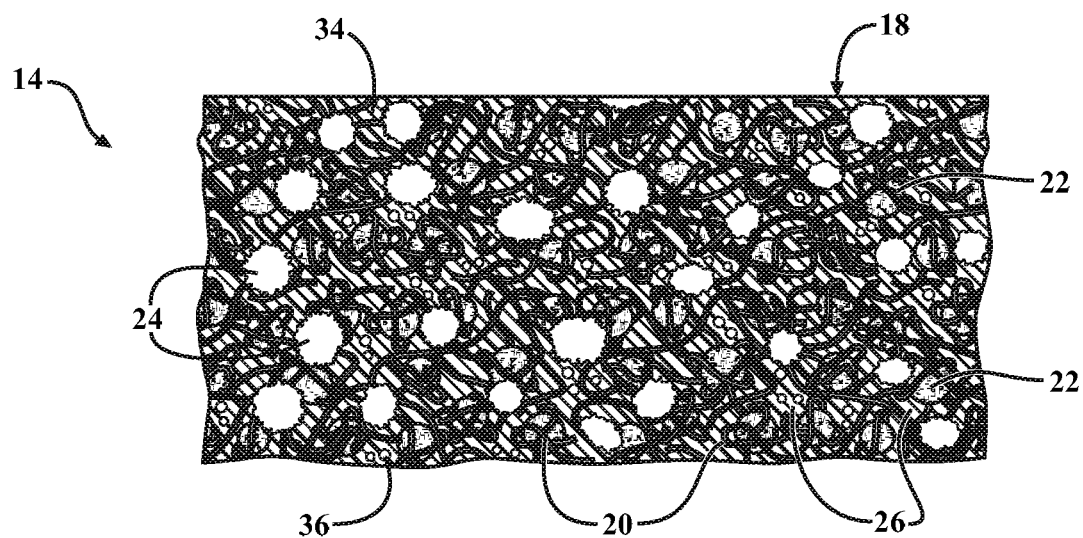
FIG. 2 is a cross-sectional view of one embodiment of a deposit.
Figure 3:
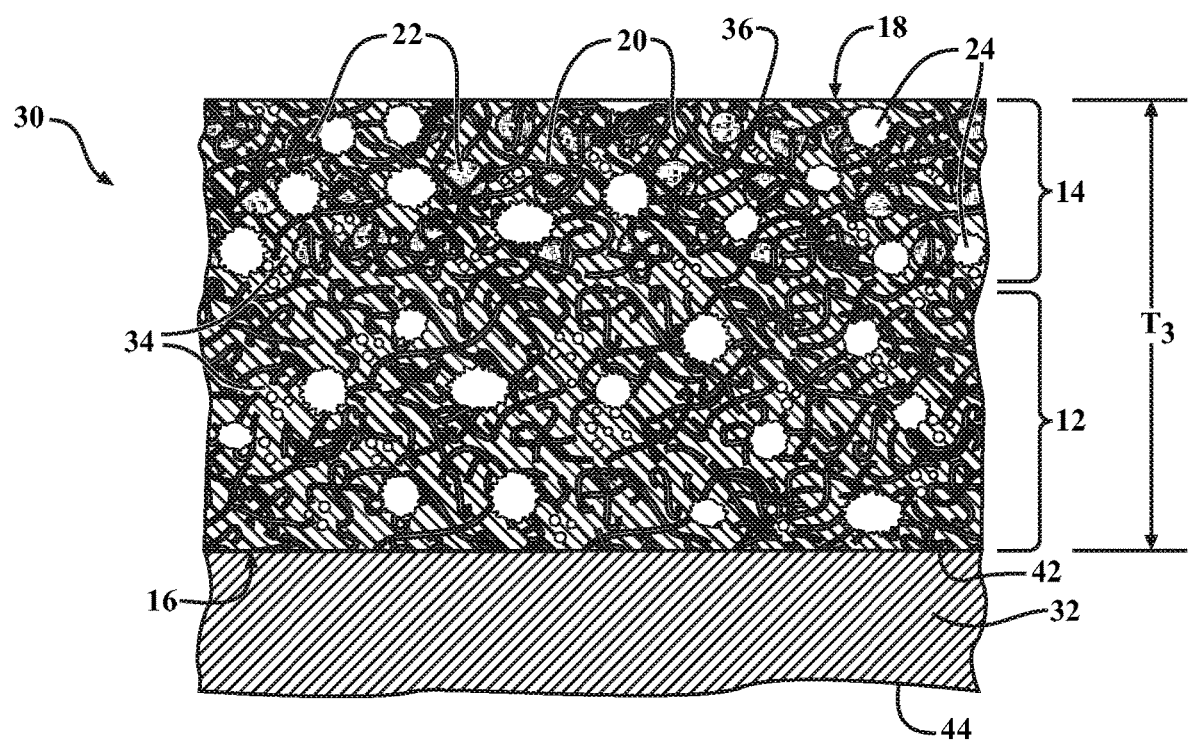
FIG. 3 is a cross-sectional view of a friction plate including the friction material of FIG. 1 and a substrate.
Figure 4:
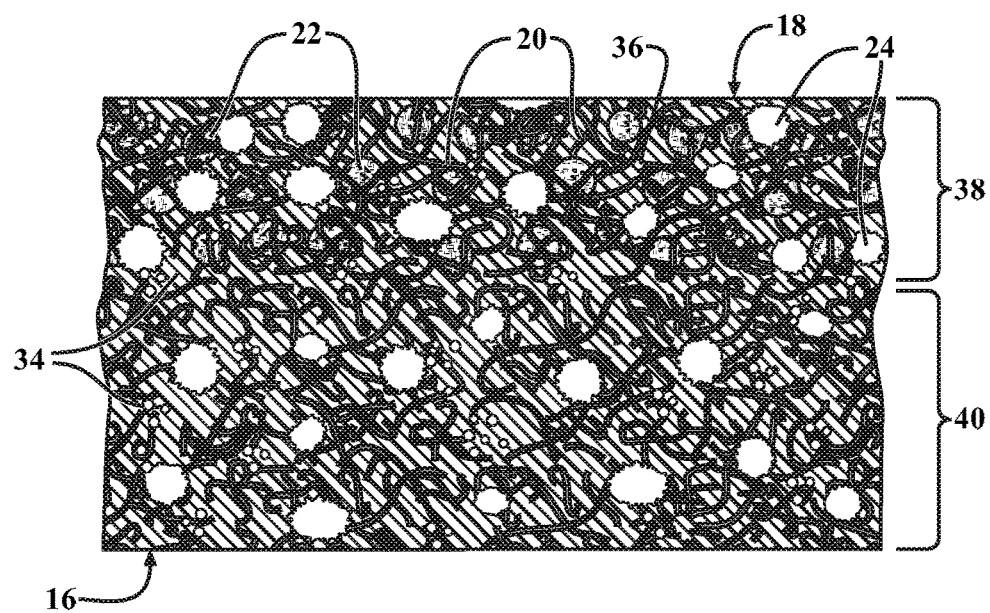
FIG. 4 is a cross-sectional view of another embodiment of a friction material including a base and a deposit.

Filler:

In addition to the fibers, and as also shown in FIGS. 1, 3, and 4, the base (12) also includes a filler (24) present in an amount of from 30 weight percent to less than 50 weight percent, based on a total weight of the base (12). In various embodiments, the filler (24) is present in an amount of from 31 to 49, 32 to 48, 33 to 47, 34 to 46, 35 to 45, 36 to 44, 37 to 43, 38 to 42, 39 to 41, 30 to 45, 30 to 40, 30 to 35, 35 to 49, 35 to 45, 35 to 40, 40 to 49, 40 to 45, or 45 to 49, weight percent based on a total weight of the base (12). In additional non-limiting embodiments, all values and ranges of values within and including the aforementioned range endpoints are hereby expressly contemplated.

The filler (24) is not particularly limited and may be any known in the art. For example, the filler (24) may be a reinforcing filler or a non-reinforcing filler. The filler (24) may be chosen from silica, diatomaceous earth, graphite, and combinations thereof. In various embodiments, the filler (24) is diatomaceous earth. The filler (24) may be free of silica provided that the filler is not diatomaceous earth.

In other embodiments, the filler (24) is, includes, consists essentially of, or consists of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof. For example, such an embodiment may include graphite but be free of silica and/or diatomaceous earth. In various additional embodiments, the filler (24) is, includes, consists essentially of, or consists of, diatomaceous earth. Diatomaceous earth is a mineral including silica. Of course, all of the particles of the filler (24) may be diatomaceous earth or, alternatively, may include a combination of different types of particles such as various combinations of diatomaceous earth, carbon, graphite, and alumina. The type or types of filler (24) included in the may vary depending on the physical characteristics sought.

In various embodiments, the base (12) further includes graphite, either as part of the filler (24) or independently therefrom. For example, in some embodiments, the base (12) may further include graphite in an amount of up to 20 weight percent based on a total weight of the base (12). If the graphite is included, it will be included in an amount of greater than zero and typically less than 20, weight percent based on a total weight of the base (12). In various embodiments, the graphite is present in an amount of from 1 to 20, 2 to 19, 3 to 18, 4 to 17, 5 to 16, 6 to 15, 7 to 14, 8 to 13, 9 to 12, 10 to 11, 5 to 10, 5 to 15, 5 to 19, 10 to 15, 10 to 19, or 15 to 19, weight percent based on a total weight of the base (12). In additional non-limiting embodiments, all values and ranges of values within and including the aforementioned range endpoints are hereby expressly contemplated.

In other embodiments, the graphite is included in any amount that is described above relative to the filler (24) itself, e.g. in an amount of from 31 to 49, 32 to 48, 33 to 47, 34 to 46, 35 to 45, 36 to 44, 37 to 43, 38 to 42, 39 to 41, 30 to 45, 30 to 40, 30 to 35, 35 to 49, 35 to 45, 35 to 40, 40 to 49, 40 to 45, or 45 to 49, weight percent based on a total weight of the base (12). Said differently, the graphite can be the filler (24) itself and thereby be present in any amount described above in which the filler (24) itself can be present. In additional non-limiting embodiments, all values and ranges of values within and including the aforementioned range endpoints are hereby expressly contemplated. The terminology "consists essentially of" may describe embodiments that include one or more of the aforementioned fillers (24) and that are simultaneously free of one or more of the aforementioned fillers (24).

The role of the filler (24) is typically to affect the pore size of the friction material (10) and may also affect elasticity, each described in greater detail below. For example, when the size of individual particles of the filler (24) is larger, the particles do not pack together as tightly when the friction material (10) is formed. This tends to lead to the formation of larger pore sizes. Conversely, when the size of the individual particles of the filler (24) is smaller, the particles pack together more tightly when the friction material (10) is formed. This tends to lead to the formation of smaller pore sizes.

In various embodiments, the filler (24) may be chosen from any one or more of the friction modifiers (22) described below. Alternatively, any one of the friction modifiers (22) below may be chosen from any one or more of the fillers (24) described above. Depending on type, amount utilized, and location, the filler (24) may act as, or share characteristics with, a friction modifier (22) and/or the friction modifier (22) may act as, or share characteristics with, a filler (24).

The filler (24) and/or friction modifier (22) may have a particle size from about 0.5 to about 80 microns. The particle size can be used to customize three-dimensional structure of the friction material (10), e.g. to maximize pore size and porosity. In additional non-limiting embodiments, all values and ranges of values within and including the aforementioned range endpoints are hereby expressly contemplated.

Deposit:

As shown in FIGS. 1-4, the friction material (10) also includes the deposit (14). The deposit (14) may be further defined as a layer or simply as an additive to the base (12). If a layer, the deposit (14) is typically described as a secondary layer and is typically not discrete and well defined relative to edges and/or demarcation. Instead, the secondary layer is typically indiscrete and may blend into the base (12), as first described above. For example, the secondary layer may blend into the base (12) in a gradient type of pattern.

The combination of the base (12) and the deposit (14) typically form what can be described as substrate material. The surface of the substrate material may be alternatively described as a friction generating surface (18). The surface may include or be only the base (12) and the deposit (14) (without the resin (26/34)) or may include or be the base (12), deposit (14), and the resin (26/34) (whether cured or uncured). Typically, the terminology "substrate material" describes embodiments that are free of the resin (26/34) (whether cured or uncured).

In various embodiments, the friction material (10) includes the base (12) while the deposit (14) itself is described as a friction generating layer. In such embodiments, the base (12) presents a bonding surface (16). The friction generating layer (e.g. the deposit (14)) may then present the friction generating surface (18) disposed parallel to and facing opposite the bonding surface (16) of the base (12). In other words, the deposit (14) itself may form the friction generating surface (18) or the combination of the base (12) and the deposit (14) (e.g. if not present as discreet layers) may form the friction generating surface (18). In various embodiments, the friction material (10) has a thickness defined as a distance between the friction generating surface (18) and the bonding surface (16). In various other embodiments, the friction generating layer extends from the friction generating surface (18) towards the bonding surface (16) up to 30%, alternatively up to 40% of the thickness.

Friction Modifier:

As shown in FIGS. 1-4, the deposit (14) includes the friction modifier (22). The terminology "friction modifier (22)" is well known in the art and may include or be particles of various compounds. For example, the friction modifier (22) may be chosen from silica, diatomaceous earth, rubber, graphite, cashew nut, and combinations thereof. In various embodiments, the friction modifier (22) is, includes, consists essentially of, or consists of, silica and/or diatomaceous earth. In other embodiments, the friction modifier (22) is, includes, consists essentially of, or consists of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof. In various additional embodiments, the friction modifier (22) is, includes, consists essentially of, or consists of, diatomaceous earth. Diatomaceous earth is a mineral comprising silica. Diatomaceous earth is an inexpensive, abrasive material that exhibits a relatively high coefficient of friction. In other embodiments, silica particles such as diatomaceous earth, and/or silicon dioxide are utilized. The silica particles are inexpensive inorganic materials which may bond strongly to the fibers. Of course, all of the particles of the friction modifier (22) may be diatomaceous earth or, alternatively, may include a combination of different types of particles such as various combinations of diatomaceous earth, carbon, graphite, and alumina. Celite and Celatom are two trade names of diatomaceous earth that may be used. The terminology "consists essentially of" may describe embodiments that include one or more of the aforementioned friction modifiers (22) and that are simultaneously free of one or more of the aforementioned friction modifiers (22). For example, such an embodiment may include graphite but be free of silica and/or diatomaceous earth. In other embodiments, the friction modifier (22) is chosen from silica particles, resin powders such as phenolic resins, silicone resins, epoxy resins and mixtures thereof, partially and/or fully carbonized carbon powders and/or particles, and combinations thereof. In various embodiments, the friction modifier (22) provides a high coefficient of friction to the friction material (10). The type or types of friction modifiers (22) utilized may vary depending on the friction characteristics sought. Some types of friction modifiers (22) may also provide the friction material (10) with a smooth friction surface and provide a good "shift feel" and friction characteristics to the friction material (10) such that any "shudder" is minimized, when used, for example, in a transmission (46).

The friction modifier (22) may provide a three dimensional surface to the base (12). In various embodiments, the friction modifier (22) is in particle form. For example, uniformity of friction modifying particles may be achieved by using a range and size of particles that is from 0.5 to 80 microns, e.g. from 0.5 to 20 microns. In various embodiments, the particles of the friction modifier (22) have an average diameter of from 100 nm to 80 µm, from 500 nm to 30 µm, or from 800 nm to 20 µm. In some embodiments, if the friction modifying particle size is too large or too small, an optimum three-dimensional structure is not achieved. In additional non-limiting embodiments, all values and ranges of values within and including the aforementioned range endpoints are hereby expressly contemplated.

In various embodiments, the friction modifier (22) is elastomeric particles that are elastic and exhibit rubber-like properties. Various suitable elastomeric particles are particles derived from cashew nut shell oil, rubber, and combinations thereof. In some embodiments, the elastomeric particles are rubber particles including, consisting essentially of, or consisting of silicone rubber, styrene butadiene rubber ("SBR"), butyl rubber, and halogenated rubbers such as chlorobutyl rubber, bromobutyl rubber, polychloroprene rubber, and nitrile rubber. In some embodiments, the elastomeric particles include, consist essentially of, or consist of, silicone rubber. In other embodiments the elastomeric particles include, consist essentially of, or consist of, nitrile rubber. In another embodiment, the elastomeric particles include the elastomeric particles which include, consist essentially of, or consist of, cashew nut particles or particles derived from cashew nut shell oil. The terminology "consists essentially of" may describe embodiments that include one or more types of the aforementioned compounds and be free of one or more other types of the aforementioned compounds.

In various embodiments, the elastomeric particles have average diameters of less than 40 µm, alternatively from 2 µm to 40 µm, alternatively from 5 µm to 30 µm, alternatively from 5 µm to 15 µm. Advantageously, elastomeric particles of the friction generating layer having an average diameter of less than 40 µm typically improve elasticity and may unexpectedly yield a friction material (10) having an improved static coefficient of Friction (COF). Further, in various embodiments, the elastomeric particles have a thermal stability of 200° C. or greater, alternatively 300° C. or greater, alternatively 400° C. or greater (and have an upper value for thermal stability as would be understood by those of skill in the art). The terminology "thermal stability" describes that the elastomeric particles do not melt, soften, or decompose. The thermal stability of the elastomeric particles is typically determined by thermal gravimetric analysis ("TGA"). The temperature at which a sample of the elastomeric particles analyzed via TGA begins to lose weight is the temperature at which the elastomeric particles lose thermal stability.

In various embodiments, the friction modifier (22) is utilized in an amount of from 0.2 to 20 percent by weight based on a total weight of the base (12). In various embodiments, the friction modifier (22) is utilized in an amount of from 0.2 to 15, 0.2 to 10, 0.2 to 5, 1 to 10, 1 to 5, 2 to 5, 2 to 6, 2 to 15, etc., percent by weight based on a total weight of the base (12). In various embodiments, the area of coverage of the friction modifier (22) on a surface of the base (12) is from 3 to 90% of the surface area. In additional non-limiting embodiments, all values and ranges of values within and including the aforementioned range endpoints are hereby expressly contemplated.

Figure 10A:
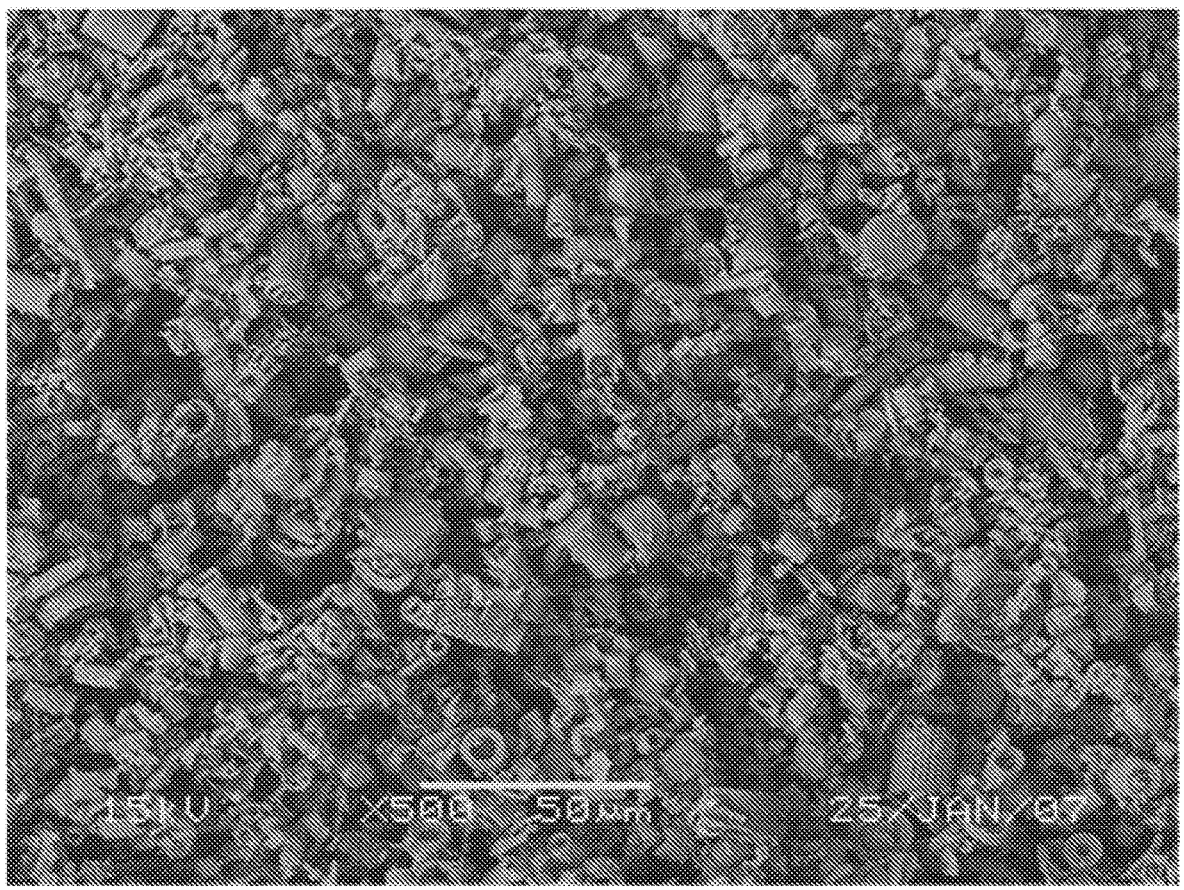
FIG. 10A is an electron micrograph of one embodiment of flux-calcined diatomaceous earth having a median particle diameter of about 11 micrometers and a cylindrical shape.
Figure 10B:
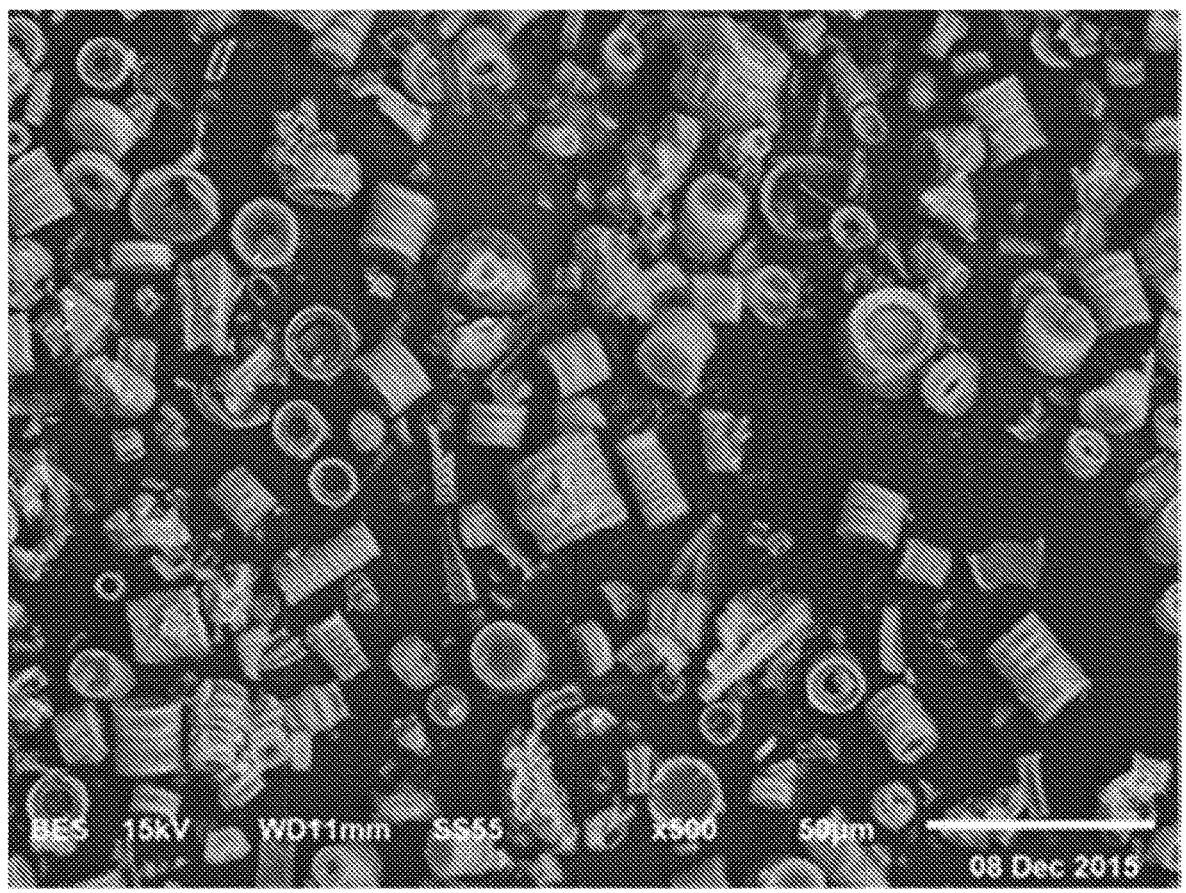
FIG. 10B is an electron micrograph of another embodiment of natural diatomaceous earth having a median particle diameter of about 15 micrometers and a cylindrical shape.

In various embodiments, the filler (24) and the friction modifier (22) may be the same or different. For example, the filler (24) and the friction modifier (22) may be the same, e.g. both diatomaceous earth. However, at the same time, the filler (24) and the friction modifier (22) may be different types of diatomaceous earth. For example, the diatomaceous earth may be flux-calcined or natural or a combination thereof. Moreover, the diatomaceous earth may have a mean particle diameter of 0.5 to 25, 1 to 25, 5 to 25, 5 to 20, 5 to 15, 5 to 10, 0.5 to 5, 1 to 5, 2 to 4, 10 to 20, 11 to 19, 12 to 18, 13 to 17, 14 to 16, or 15, micrometers. The diatomaceous earth may also have a pH of 7, 8, 9, or 10 when in a 10% slurry, as calculated using methods known to those of skill the art. The diatomaceous earth may have an oil absorption (lb./100 lbs) (Gardner-Coleman) of from 120 to 220, 130 to 210, 140 to 200, 150 to 190, 160 to 180, 170 to 180, 130 to 160, or 140 to 150. The diatomaceous earth may have cylindrically shaped particles or particles of different shapes, as would be appreciated by one of skill in the art. Moreover, the diatomaceous earth may have a free moisture (max % water) of less than or equal to 5, 4, 3, 2, 1, or 0.5. Non-limiting options for the diatomaceous earth are show in FIGS. 10A and 10B.

Resin:

As shown in FIGS. 1-4, the friction material (10) also includes the resin (26/34) disposed or dispersed throughout the friction material (10). In other words, the resin (26/34) may be dispersed homogeneously or heterogeneously throughout the friction material (10). In various embodiments, the resin (26/34) is dispersed homogeneously or heterogeneously throughout the base (12) and may partially or wholly encapsulated one or more of the deposit (14), the filler(s) (24), and/or the friction modifier(s) (22). In the Figures, the numeral 26 refers to an uncured resin. Also in the Figures, the numeral 34 refers to a partially cured or completely cured resin.

The resin (26/34) may be any known in the art and may be cured or curable. Alternatively, the resin (26) may be of the type that does not cure. In various embodiments, depending on the stage of formation of the friction material (10), the resin (34) may be partially cured, entirely cured, or less than entirely cured. Alternatively, the resin (26) may not be cured at all. The resin (26/34) may be cured, uncured, or partially cured, depending on which stage of the manufacturing process is reviewed.

In various embodiments, the resin (26/34) may be any thermosetting resin suitable for providing structural rigidity to the friction material (10). Various resins that may be utilized include phenolic resins, phenolic-based resins, and phenolic-modified resins. A phenolic resin is a class of thermosetting resins that is produced by the condensation of an aromatic alcohol, typically a phenol, and an aldehyde, typically a formaldehyde. A phenolic-based resin is a thermosetting resin blend that typically includes at least 50 wt. % of a phenolic resin based on the total weight of all resins and excluding any solvents or processing acids. It is to be understood that various phenolic-based resins may include modifying ingredients, such as epoxy, butadiene, silicone, tung oil, benzene, cashew nut oil and the like. In phenolic-modified resins, the phenolic resin is generally present at 50% or greater by weight (excluding any solvents present). However, in one or more embodiments, the resin (26/34) may include, for example, 5 to 80%, by weight of a silicone resin based on the weight of the mixture of the silicone-phenolic resin mixture (excluding solvents and other processing acids). Examples of phenolic and phenolic-silicone resins that may be used are described in U.S. Pat. No. 5,998,307, which is expressly incorporated herein in its entirety in various non-limiting embodiments.

Silicone resins that may be used may include thermal curing silicone sealants and silicone rubbers. Various silicone resins may also be used such as those that include xylene and acetylacetone (2,4-pentanedione). In still other embodiments, an epoxy modified phenolic resin which includes 5 to 25 percent, by weight of an epoxy compound with the remainder (excluding solvents and other processing aids) phenolic resin, may also be used.

In various embodiments, the resin (26/34) is present in an amount of from 25 to 60 weight percent based on a total weight of the base (12) and the deposit (14). For example, the resin (26/34) may be present in an amount of from 25 to 35, 25 to 30, 30 to 40, 30 to 35, 35 to 40, 40 to 60, 45 to 55, 45 to 50, or 50 to 55, weight percent based on a total weight of the base (12) and the deposit (14). This value may be alternatively described as resin "pick up." In additional non-limiting embodiments, all values and ranges of values within and including the aforementioned range endpoints are hereby expressly contemplated. Once cured, the resin (34) confers strength and rigidity to the friction material (10) and adheres the aramid fibers (20), filler particles (24), etc. while maintaining a desired porosity for proper lubricant flow and retention.

Free of Material Having a Thermal Degradation Temperature of Less than 150° C.:

The friction material (10) may be free of a material (e.g. fibers) having a thermal degradation temperature of less than 200° C., 175° C., or 150° C. The terminology "thermal degradation temperature" is known in the art as kindling point of a substance, i.e., the lowest temperature at which the substance will spontaneously ignite in normal atmosphere without an external source of ignition, such as a flame or spark. This temperature is required to supply the activation energy needed for combustion. Relative to this disclosure, high temperatures can be reached due to friction that occurs when the friction material (10) is used in a clutch assembly. If temperatures exceed thermal degradation temperatures, the materials (such as the fibers) can combust and/or decompose thereby reducing the effectiveness of the friction material (10). Examples of materials (e.g. fibers) that have thermal degradation temperatures of less than 200° C. are cotton, cellulose, and combinations thereof. In various embodiments, the friction material (10) is free of cotton and/or free of cellulose fibers. The cellulose fibers may be natural cellulose, regenerated cellulose, regenerated lyocell cellulose, and combinations thereof. Natural cellulose is a straight chain polysaccharide that includes repeating β(1→4)-glycosidic-linked glucose units and which has the general polymeric formula $(C_6H_1O_5)_n$ with the number of repeating units ("n") usually ranging from 100 to 10,000. Regenerated cellulose has the same chemical formula as natural cellulose and is prepared from naturally-occurring polymers (e.g., wood pulp or bamboo) from one of several processes including the viscose process, the cuprammonium process, and an organic solvent spinning process. Some examples of regenerated cellulose are rayon, modal, and lyocell. A cellulose derivative is a modified cellulose in which the hydroxyl group on the glucose units is fully or partially substituted with, for example, an ester group. Some examples of a cellulose derivative are cellulose acetate and cellulose triacetate. In other embodiments, it is contemplated that the friction material (10) may be free of fibers having a thermal degradation temperature of less than 200° C. but may include fillers (24) and/or other materials that do, in fact, have a thermal degradation temperature of less than 200° C.

Porous Layer:

In additional embodiments, the base (12) is further defined as a porous layer and particles of the friction modifier (22) are disposed in or throughout the porous layer. The porous layer may include a first outermost surface for exposure to the environment (which may be the friction generating surface (18) described above) and a second outermost surface for adhesion to the substrate (32) (such as the metal plate). The second outermost surface may be the bonding surface (16) described above. The porous layer may further define an upper quadrant (38) disposed closest to the first outermost surface and a lower quadrant (40) disposed closest to the second outermost surface. Particles of the friction modifier (22) may be disposed in the upper quadrant (38) of the porous layer.

Physical Properties of the Friction Material:

As shown in FIGS. 1-4, the friction material (10) typically defines pores (36), e.g. a plurality of pores (36). Each of the pores (36) has a pore size. The average, or mean, pore size is typically represented as a distribution. The pore size may be determined using ASTM D4404-10. In various embodiments, the median pore size is, or alternatively the range of all pore sizes in the friction material (10) is, from 0.5 μm to 50 μm, 1 μm to 50 μm, 5 μm to 50 μm, 10 μm to 45 μm, 15 μm to 40 μm, 20 μm to 35 μm, 25 μm to 30 μm, 30 μm to 35 μm, 5 μm to 15 μm, 5 μm to 10 μm, 10 μm to 15 μm, 10 μm to 20 μm, 5 μm to 20 μm, 5 μm to 7 μm, 7 μm to 10 μm, 7 μm to 15 μm, 8 to 15, 9 to 14, 10 to 13, or 11 to 12, μm, as determined using ASTM D4404-10. In additional non-limiting embodiments, all values and ranges of values within and including the aforementioned range endpoints are hereby expressly contemplated.

In other embodiments, the friction material (10) has a porosity of from 60% to 85% as determined using ASTM D4404-10. The porosity of the friction material (10) can be alternatively described as a percentage of the total friction material (10) that is open to air or the percentage of the total friction material (10), based on volume, that is air or not solid. In various embodiments, the friction material (10) has a porosity of from 60 to 80, 60 to 75, 60 to 70, 60 to 65, 65 to 85, 65 to 75, 65 to 70, 70 to 85, 70 to 80, 70 to 75, 75 to 85, 75 to 80, or 80 to 85, %, as determined using ASTM D4404-10. In still other embodiments, the friction material (10) has a porosity of 60, 61, 62, 63, 64, 65, 66, 67, 78, 69, or 70, %, as determined using ASTM D4404-10. In additional non-limiting embodiments, all values and ranges of values within and including the aforementioned range endpoints are hereby expressly contemplated.

In various embodiments, the friction material (10) exhibits improved anti-shudder characteristics along with improved elasticity and/or porosity which allows for more uniform heat dissipation during use. Fluids in transmissions can rapidly move through the pores (36) of the friction material (10). Further, improved elasticity and/or porosity provides more uniform pressure or even pressure distribution on the friction material (10) such that uneven lining wear or "hot spots" are minimized.

The more porous the structure of the friction material (10), the more efficiently heat is dissipated. The oil flow in and out of the friction material (10) during engagement of the friction material (10) during use occurs more rapidly when the friction material (10) is porous. For example, when the friction material (10) has a higher mean flow pore diameter and porosity, the friction material (10) is more likely to run cooler or with less heat generated in a transmission due to better automatic transmission fluid flow throughout the pores (36) of the friction material (10). During operation of a transmission system, oil deposits on the friction material (10) tend to develop over time due to a breakdown of automatic transmission fluid, especially at high temperatures. The oil deposits tend to decrease the size of the pores (36). Therefore, when the friction material (10) is formed with larger pores (36), the greater the remaining/resultant pore size after oil deposit. Porosity of the friction material (10) may be further modified based on choice of the fibers, resin, filler, filler particle size, and substrate material weight.

In various embodiments, the friction material (10) may have high porosity such that there is a high fluid permeation capacity during use. In such embodiments, it may be important that the friction material (10) not only be porous, but also be compressible. For example, the fluids permeated into the friction material (10) typically must be capable of being squeezed or released from the friction material (10) quickly under the pressures applied during operation of the transmission, yet the friction material (10) typically must not collapse. It may also be important that the friction material (10) have high thermal conductivity to also help rapidly dissipate the heat generated during operation of the transmission.

The total thickness of the friction material (10) ($T_1$), without the resin, is typically from 0.3 to 1.6, from 0.4 to 1.5, from 0.5 to 1.4, from 0.6 to 1.3, from 0.7 to 1.2, from 0.8 to 1.1, or from 0.9 to 1, mm. This thickness refers to a thickness prior to bonding to the metal plate and may be referred to as caliper thickness. This thickness ($T_1$) is typically the thickness of the fibers/base including the deposit (e.g. substrate material without resin). In additional non-limiting embodiments, all values and ranges of values within and including the aforementioned range endpoints are hereby expressly contemplated.

After bonding to the metal plate, the total thickness of the friction material (10) ($T_3$) is typically from 0.3 to 1.2, from 0.4 to 1.1, from 0.5 to 1, from 0.6 to 0.9, or from 0.7 to 0.8, mm. This thickness ($T_3$) is typically the thickness of the fibers/base including the deposit and resin and is measured after bonding to the metal plate. In additional non-limiting embodiments, all values and ranges of values within and including the aforementioned range endpoints are hereby expressly contemplated.

The friction material (10) of this disclosure, e.g. when used to form a friction plate (30), typically exhibits a dynamic coefficient of friction (COF), e.g. from 0.10 to 0.16, 0.11 to 0.15, from 0.12 to 0.14, or from 0.12 to 0.13, as determined using the test described below and the torque curve generated therefrom, as is appreciated by those of skill in the art. In various embodiments, the friction material (10) exhibits a steady or gradually decreasing torque curve over time, especially at lower speeds, as will be understood by those of skill in the art. In additional non-limiting embodiments, all values and ranges of values within and including the aforementioned range endpoints are hereby expressly contemplated.

The test used to determine the COF is conducted on a GK 3 test bench. Four double sided friction plates and the corresponding application DCT fluid are used to simulate the operating environment of a dual-clutch transmission at vehicle launch. The application DCT fluid is supplied to the friction interfacing surface of the friction materials at a flow rate of 22 L/min. This flow rate caused the temperature at the friction interfacing surface of the friction materials and their opposed mating surfaces to reach 440° C. The launch test had the following additional test parameters: simulated inertia: 0.85 KgM$^2$; maximum power of 275 KW; energy of 350 KJ; specific net power of 6.7 W/mm$^2$; lining pressure of 0.42 MPa; a maximum rotational speed of 6500 rpm; and a stop time of 1.5 seconds. Measurements of friction torque gradient can be plotted against the number of friction material engagement/disengagement cycles. A positive frictional torque gradient is generally representative of quality frictional performance. A negative frictional torque gradient is generally indicative of glazing.

In various embodiments, the friction material (10)/friction plate (30) exhibits a percent compression from 10 to 30 percent or from 10 to 20 percent, e.g. from 11 to 19, 12 to 18, 13 to 17, 14 to 16, or 15, percent, as determined after measuring the thickness of the fibers and filler (24) (without resin (26/34); also known as "substrate material") before bonding to the substrate (32) as compared to the thickness of the friction material (10) (including the cured resin (34)) after bonding to the substrate (32), as is understood by those of skill in the art. In various embodiments, the compression may be calculated using $T_1$ and $T_3$, as first introduced above. In additional non-limiting embodiments, all values and ranges of values within and including the aforementioned range endpoints are hereby expressly contemplated.

In still other embodiments, the friction material (10) of this disclosure, e.g. when used to form a friction plate (30), has a final lining thickness after curing of the resin (34) and bonding to the metal plate, of from 0.4 to 1.2 mm. In other embodiments, this thickness is from 0.5 to 1.1, from 0.6 to 1, from 0.7 to 0.9, or from 0.8 to 0.9, mm. This may be alternatively described as $T_3$, as first introduced above. In additional non-limiting embodiments, all values and ranges of values within and including the aforementioned range endpoints are hereby expressly contemplated.

In even further embodiments, the friction material (10) of this disclosure, e.g. when used to form a friction plate (30), does not exhibit hot spots and/or heat stains, as would be understood by those in the art, after 10, 50, 100, 200, 500, 1000, or 2000, cycles, wherein a cycle is understood by those of skill in the art. In additional non-limiting embodiments, all values and ranges of values within and including the aforementioned range endpoints are hereby expressly contemplated.

Relative to all of these physical properties, in additional non-limiting embodiments, all values and ranges of values within and including the aforementioned range endpoints are hereby expressly contemplated. In various non-limiting embodiments, the friction material (10) must have a wide variety of acceptable characteristics such as being resilient or elastic yet resistant to permanent deformation, abrasion and stress, having high heat resistance and being able to dissipate heat quickly, and having long lasting, stable and consistent frictional performance. Additional Non-Limiting Embodiments:

In other embodiments, the friction material (10) is free of carbon fiber(s). In further embodiments, the friction material (10) is free of silica provided that the friction material (10) does not include diatomaceous earth. Alternatively, the friction material (10) may be free of graphite. Similarly, the friction material (10) may be free of any one or more of the aforementioned fillers (24) and/or friction modifiers (22) that are described in detail above. The friction material (10) may be free of some types of aramid fibers (20) (e.g. those of particular size or fibrillation), such as any of those described above, so long as some aramid fibers (20) are utilized to form the friction material (10).

In additional non-limiting embodiments, the friction material (10) includes the friction generating (also known as interfacing) surface (18) that experiences interfacial frictional engagement with an opposed mating surface (e.g. a surface of a separator plate) in the presence of a lubricant. Located at and adjacent to the friction generating surface (18) are the base (12) and deposit (14) that includes the friction modifier (22) that is adhered with the (cured) resin (26/34). The aramid fibers (20) fibers may include emanating fibrils that form an interconnected web that holds particles of the friction modifier (22) and keeps them disposed at or near the friction generating surface (18). Some of the aramid fibers (20) and/or particles of the friction modifier (22) may be exposed at the friction generating surface (18) for contact with the opposed mating surface during frictional engagement. The ability of the web to keep the particles of the friction modifier (22) at or near the friction generating surface (18) can provide the friction material (10) with a stable coefficient of friction. Moreover, in some instances, the aramid fibers (20) can have an anti-glazing effect if they are susceptible to thermal decomposition. The thermal decomposition of the aramid fibers (20) can help resist glazing by stripping surface-deposited (14) glaze material from the friction generating surface (18) and constantly exposing fresh aramid fibers (20).

In still other embodiments, the friction material (10) may have a thickness defined by the distance between the friction generating surface (18) and an oppositely facing bonding surface (16). The oppositely facing bonding surface (16) is the surface of the friction material (10) where bonding to the substrate (32) or other material (such as the metal plate) is meant to be accomplished. A friction stability region that extends from the friction generating surface (18) towards the oppositely facing bonding surface (16) may include a balanced amount of the aramid fibers (20) and particles of the friction modifier (22). The friction stability region may extend from the friction generating surface (18) to a depth up to 40%, up to 20%, up to 10%, or up to 5% of the thickness of the friction material (10). For example, if the friction material (10) is 0.25 mm to 2 mm thick, the friction stability region may extend inwards from the friction generating surface (18) to a depth up to 0.0125 mm (5% of 0.25 mm) to 0.80 mm (40% of 2 mm). The rest of the friction material (10) underlying the friction stability region can have the same general construction as the friction stability region or a different construction. In additional non-limiting embodiments, all values and ranges of values within and including the aforementioned range endpoints are hereby expressly contemplated.

In various embodiments, the friction material (10) is bonded to the substrate (32) by any suitable technique known to skilled artisans. Several examples of the substrate (32) include, but are not limited to, a clutch plate, a synchronizer ring, and a transmission band. The friction material (10) may include the friction generating surface (18) and an oppositely facing bonding surface (16). The friction generating surface (18) can experience select interfacial frictional engagement with the opposed, rotating surface in the presence of a lubricant and the oppositely facing bonding surface (16) achieves bonded attachment to the substrate (32) with the aid of an adhesive or some other suitable bonding technique. The lubricant may be any suitable lubricating fluid such as, for example, an automatic transmission fluid. The flow rate of the lubricant over the friction material (10) can be managed to allow the temperature at the friction generating surface (18) to exceed 350° C. for extended periods in an effort to improve fuel efficiency. In various embodiments, while the friction material (10) performs satisfactorily above 350° C., and up to 500° C., it is not limited only to such high-temperature environments and may, if desired, be used in a wet clutch designed to maintain a temperature at the friction generating surface (18) below 350° C. In additional non-limiting embodiments, all values and ranges of values within and including the aforementioned range endpoints are hereby expressly contemplated.

In still other embodiments, the friction material (10) includes a base fibrous material that supports the friction stability region of the friction material (10). The base fibrous material has a top surface and a bottom surface (e.g. the bonding surface (16) and the friction generating surface (18) described above) that define a thickness of the base fibrous material which can be, in some embodiments, from 0.25 mm to 2 mm (e.g. $T_1$). The aramid fibers (20) and particles of the friction modifier (22) that form the friction stability region may be highly intermingled with the base fibrous material such that the top surface of the base fibrous material is generally coincident with the friction generating surface (18) of the friction material (10) or, in another embodiment, the aramid fibers (20) and the particles of the friction modifier (22) may be partially intermingled with the base fibrous material and form a surface layer up to 70 μm, up to 50 μm, up to 20 μm, or up to 10 μm thick such that the top surface of the base fibrous material is not coincident with the friction generating surface (18). A variety of characteristics of the friction material (10) may determine to what extent the aramid fibers (20) and the particles of the friction modifier (22) infiltrate, or accumulate on, the top surface of the base fibrous material. These characteristics include the porosity of the base fibrous material and the amounts of the aramid fibers (20) and particles of the friction modifier (22) included in the friction stability region. In various embodiments, the bottom surface of the base fibrous material is located adjacent to the substrate (32) and is typically coincident with the oppositely facing bonding surface (16) of the friction material (10). The (cured) resin (26/34) may be evenly distributed throughout the base fibrous material as well as any portion of the friction stability region located above the top surface of the base fibrous material to provide adherence, rigidity, and structural support. A typical weight percent of the (cured) resin (26/34) in the friction material (10), in various embodiments, is from 15 to 50, weight percent. In additional non-limiting embodiments, all values and ranges of values within and including the aforementioned range endpoints are hereby expressly contemplated.

In other embodiments, the friction stability region of the friction material (10) may be constructed to permit regular regeneration of the friction generating surface (18) which, in turn, allows the friction material (10) to maintain its intended frictional performance for extended periods when the temperature at the friction interface exceeds 350° C. The bulk structure of the base fibrous material may be provided by an arrangement of the aramid fibers (20) and filler (24).

In still other embodiments, this disclosure may include any one or more elements, method steps, etc. as described in U.S. Pat. No. 6,630,416 and/or U.S. Pat. App. Pub. No. 2013/0037373, each of which is expressly incorporated herein in its entirety in various non-limiting embodiments. Alternatively, any one or more elements described herein may be modified or may be further described using descriptions set forth in one or both of the aforementioned documents that are incorporated herein.

In other embodiments, the friction material (10), and/or any of the base (12), deposit (14), or resin (26/34), or any other components described above, may be free of metallic fibers, carbon fibers, carbon particles, carbonized carbon particles, resin powders, and/or combinations thereof.

In still other embodiments, the base layer (12) may include about 50, 51, 52, 53, 54, 55, 56, 57, 58, 59, or 60 weight percent of an aramid fiber (e.g. such as poly-para-phenylene terephthalamide) or ranges thereof, about 30, 31, 32, 33, 34, 35, 36, 37, 38, 39, or 40 weight percent of diatomaceous earth or ranges thereof, and about 5, 6, 7, 8, 9, 10, 11, 12, 13, 14, or 15 weight percent of graphite or ranges thereof, each based on a total weight of the base (12). Moreover, the resin (e.g. resin pick up) may be present in an amount of about 30, 31, 32, 33, 34, or 35 weight percent or ranges thereof. In addition, the density of the friction material (10) may be 0.5, 0.55, 0.6, 0.65, 0.7, or 0.75, g/cm$^3$, or ranges thereof. All of these embodiments are free of the material having the thermal degradation temperature of less than 200° C. All combinations of the aforementioned values and ranges thereof are hereby expressly contemplated in various non-limiting embodiments. Moreover, any of these embodiments may have any one or more of the aforementioned physical properties described in this disclosure.

In further embodiments, the friction modifier (22) of the deposit (14) and the filler (24) of the base (12) are both diatomaceous earth and have the same morphology, as would be understood by those of skill in the art. In such embodiments, the amount of the friction modifier (22) and the filler may be the same or may be different from each other.

Friction Plate:

As shown in FIG. 3, this disclosure also provides a friction plate (30) that includes the substrate (32) (e.g. a metal plate), as first introduced above. The substrate (32) has (at least) two surfaces (42, 44) and the friction material (10) is typically bonded to one or both of these surfaces (42, 44). Typically, the friction plate (30) is formed once the friction material (10) is adhered or bonded to one or both surfaces (42, 44). The bonding or adherence of the friction material (10) to the one or both surfaces (42, 44) may be achieved by any adhesive or means known in the art, e.g. a phenolic resin or any resin (26/34) described above. This disclosure also provides a clutch assembly that includes the friction plate (30) and a separator plate, as would be selected by one of skill in the art. This disclosure also provides a transmission (46) that includes the clutch assembly (48). The transmission (46) may be an automatic transmission or a manual transmission.

In additional embodiments, this disclosure describes a friction material (10) for a high energy launch clutch including the substrate (32) and the friction material (10). The friction material (10) defines the aforementioned pores (36) each having a pore size. In these embodiments, the friction material (10) includes a porous primary layer having a first outermost surface for exposure to the environment and a second outermost surface for adhesion to the metal plate, wherein said porous primary layer further defines an upper quadrant (38) disposed closest to the first outermost surface and a lower quadrant (40) disposed in contact with the upper quadrant (38) and closest to the second outermost surface. The porous primary layer may be the base (12) layer as described above. Typically, the porous primary layer includes aramid fibers (20) present in an amount of 50 to 70 weight percent based on a total weight of the porous primary layer and diatomaceous earth present in an amount of from 30 to 50 weight percent based on a total weight of the porous primary layer. The friction material (10) also includes a cured phenolic resin (34) impregnated in the primary layer. In these embodiments, the friction material (10) has a porosity and median pore size as described above. Moreover, the friction material (10) is free of a material having a thermal degradation temperature of less than 200° C. In related embodiments, the aramid fibers (20) include the first poly-paraphenylene terephthalamide and the second poly-paraphenylene terephthalamide that is different from the first. In other embodiments, the friction modifier (22) is diatomaceous earth and the porous primary layer further includes graphite in an amount of up to 20 weight percent based on a total weight of the porous primary layer. In additional non-limiting embodiments, all values and ranges of values within and including the aforementioned range endpoints are hereby expressly contemplated.

This disclosure also provides the friction plate itself including the friction material (10) and the substrate and a clutch assembly including the friction plate and a separator plate. The disclosure also provides a transmission including the clutch assembly.

Method of Forming the Friction Material:

This disclosure also provides a method of forming the friction material. In various embodiments, the method includes the step of forming the base, including the fibers, coating at least one surface of the base with friction modifying particles to form the deposit, impregnating the base/deposit (also known as the substrate material) with the resin, and then curing the impregnated base/deposit at a predetermined temperature for a predetermined period of time, as would be understood by those of skill in the art. For example, the base (12) may be impregnated with the phenolic or phenolic based resin and then heated to a desired temperature for a predetermined length of time to form the friction material (10). The heating cures the phenolic resin at a temperature of about 350° F.-450° F. When other resins are present, such as a silicone resin, the heating cures the silicone resin at a temperature of about 350° F.-450° F. Thereafter, the impregnated and cured friction material (10) may be adhered to the desired substrate by suitable means.

EXAMPLES

Two examples of friction materials representative of this disclosure (Examples 1 and 2) are formed along with a comparative example of a friction material that is not representative of this disclosure (Comparative Example 1). After formation, Examples 1 and 2 and Comparative Example 1 are evaluated to determine a variety of physical properties, as set forth below. The compositions of Examples 1 and 2 and Comparative Example 1 are set forth below in Table 1 wherein the Components are set forth in weight percent based on a total weight of the Base.

TABLE 1

| Friction Material | Components | Comparative Example 1 | Example 1 | Example 2 |
|---|---|---|---|---|
| Base | Structural Fibers A, B, C | 30-40 wt % | 50-70 wt % | 50-70 wt % |
| | Material Having Thermal degradation Temperature Less Than 200° C. | 10-20 wt % | 0 wt % | 0 wt % |
| | Fillers A-G | 50-60 wt % | 30-50 wt % | 30-50 wt % |

TABLE 1-continued

| Friction Material | Components | Comparative Example 1 | Example 1 | Example 2 |
|---|---|---|---|---|
| Deposit | Friction Modifiers A, B | 2-10 wt % | 1-15 wt % | 1-15 wt % |
| Curable Resin | Phenolic Resin | 30-45 wt % | 30-60 wt % | 30-60 wt % |
| Target Property | Density (g/cm$^3$) | 0.65-0.75 | 0.5-0.65 | 0.5-0.65 |

The amount of resin utilized is typically described in the art as "resin pick up." The amount of resin set forth in Table 1 is a weight percent based on a total weight of the base and the deposit together.

The Structural Fibers A, B, C include various types of poly-paraphenylene terephthalamide.

The Material Having a Thermal degradation Temperature of Less Than 200° C. includes cotton.

The Fillers A-G include carbon, diatomaceous earth, silica, and graphite.

The Friction Modifiers A, B include diatomaceous earth and silica.

Formation of Friction Plates:

After formation, Examples 1 and 2 and Comparative Example 1 are each bonded to a surface of a steel core plate using a phenolic adhesive to form a series of friction plates (Friction Plates 1 and 2 and Comparative Friction Plate 1, respectively). This method is appreciated and well understood by those of skill in the art.

The Friction Plates 1 and 2 and Comparative Friction Plate 1 are evaluated using a GK 3 test bench. Four double sided friction plates and the corresponding application DCT fluid are used to simulate the operating environment of a dual-clutch transmission at vehicle launch. The application DCT fluid is supplied to the friction interfacing surface of the friction materials at a flow rate of 22 L/min. This flow rate caused the temperature at the friction interfacing surface of the friction materials and their opposed mating surfaces to reach 440° C. The launch test had the following additional test parameters: simulated inertia: 0.85 KgM$^2$; maximum power of 275 KW; energy of 350 KJ; specific net power of 6.7 W/mm$^2$; lining pressure of 0.42 MPa; a maximum rotational speed of 6500 rpm; and a stop time of 1.5 seconds. Measurements of the coefficient of friction gradient (the difference in the friction material's coefficient of friction at a rotational speed of 500 rpm and 200 rpm) can be plotted against the number of friction material engagement/disengagement cycles. A positive COF gradient is generally representative of quality frictional performance. A negative frictional torque gradient is generally indicative poor friction performance.

Figure 5:
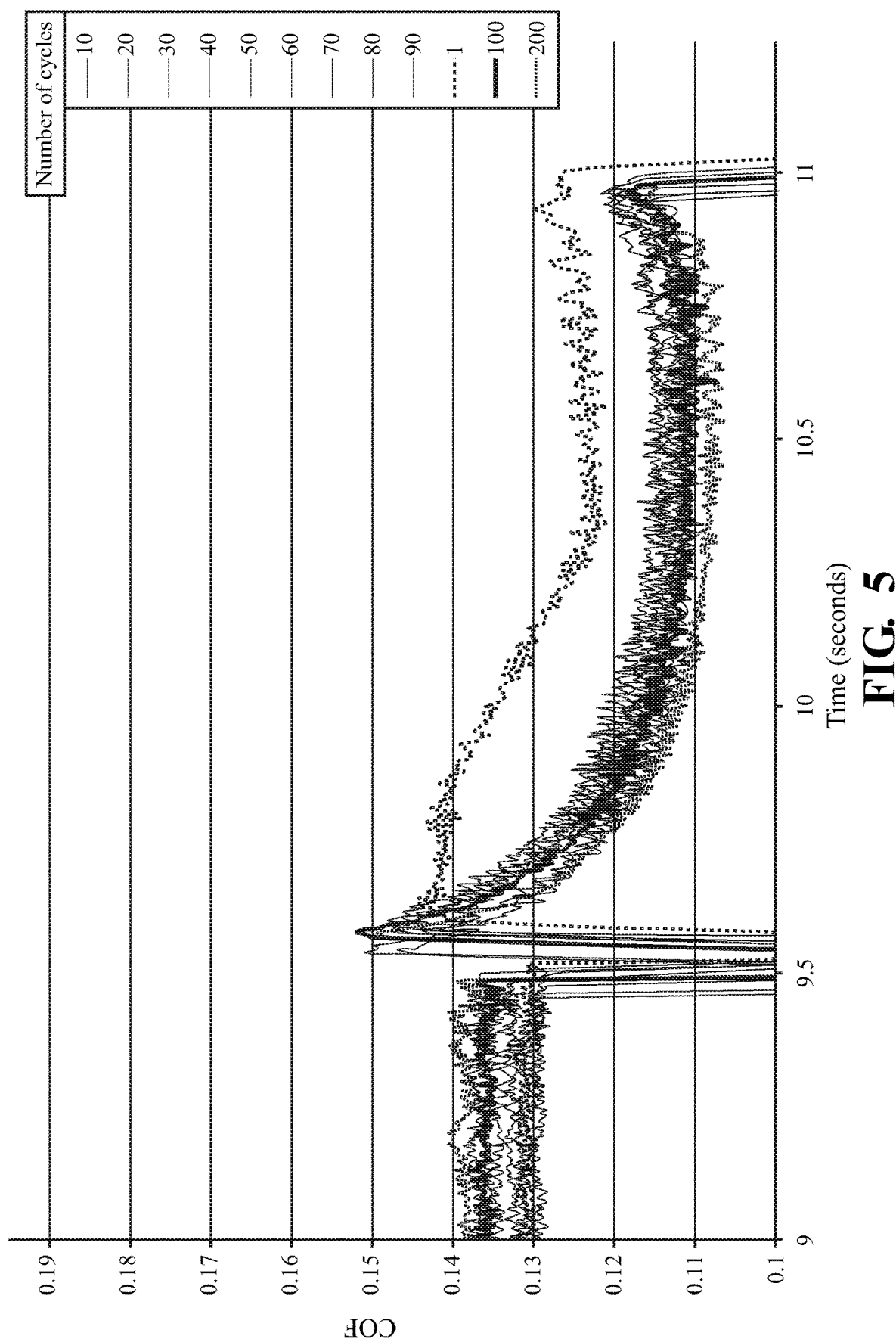
FIG. 5 is a torque-curve showing Coefficient of Friction (COF) as a function of time in the cycle and number of cycles (up to 200), of the Friction Plate of Comparative Example 1.
Figure 6:
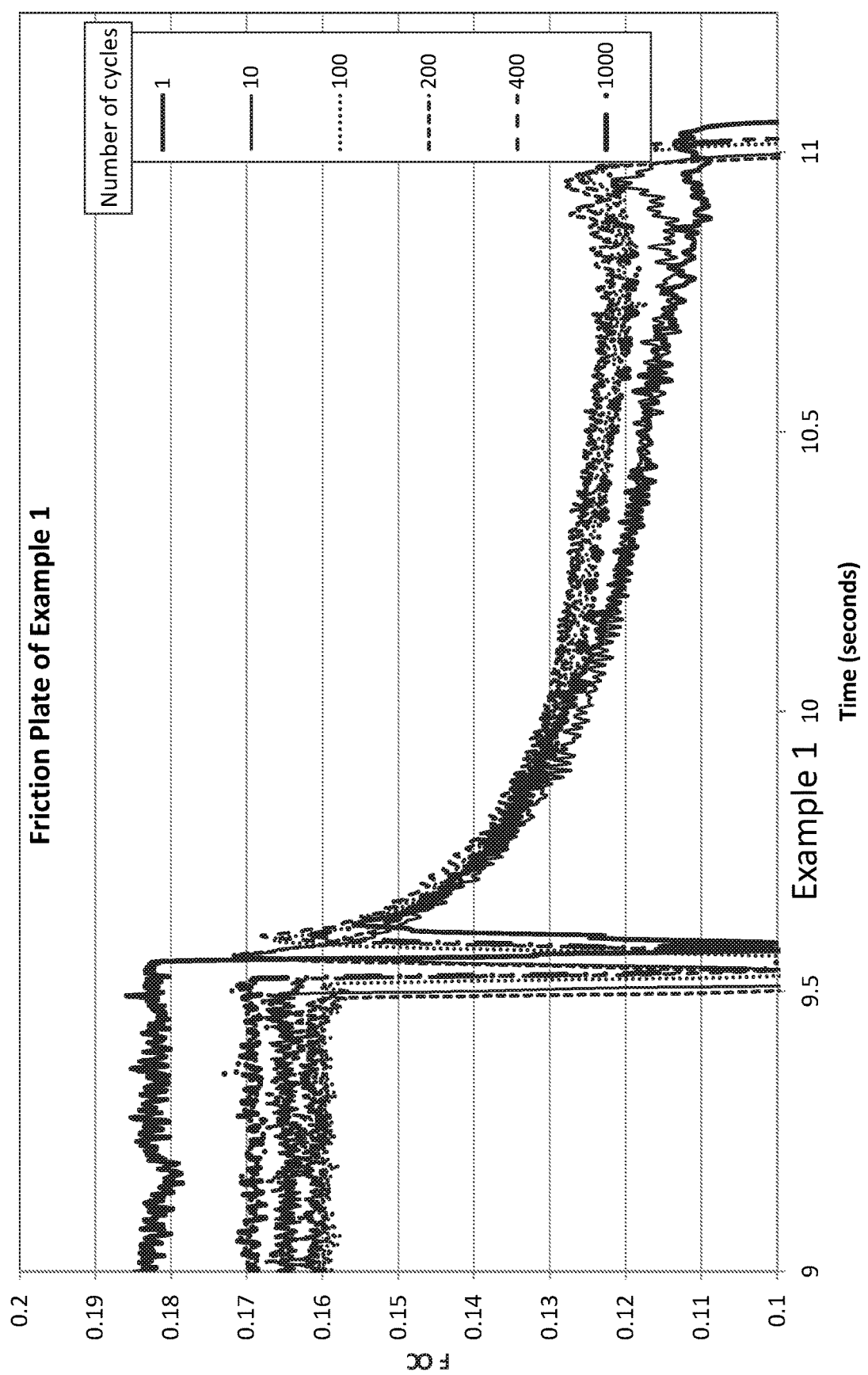
FIG. 6 is a torque-curve showing Coefficient of Friction (COF) as a function of time in the cycle and number of cycles (up to 1000), of the Friction Plate of Example 1.
Figure 7:
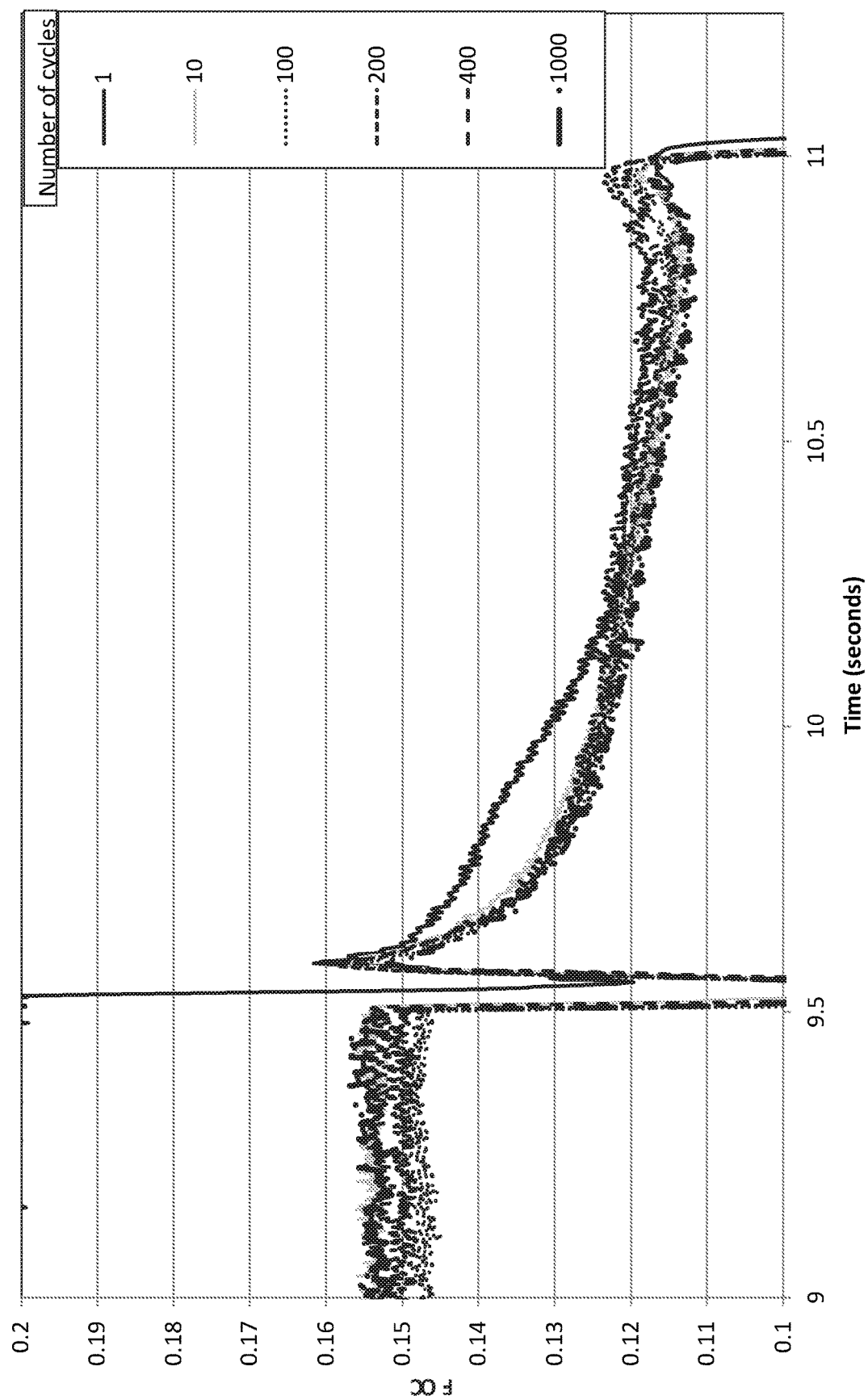
FIG. 7 is a torque-curve showing Coefficient of Friction (COF) as a function of time in the cycle and number of cycles (up to 1000), of the Friction Plate of Example 2.

The coefficient of friction is measured for each engagement cycle as shown in FIGS. 5-7. FIG. 5 shows the COF for the friction plate of Comparative Example 1. The drop in the midpoint coefficient and a rise in the end point of the curve indicates a degradation of frictional performance. Only 200 cycles were achieved for the friction plate of Comparative Example 1 before frictional performance had degraded past acceptable limits.

In contrast, FIG. 6 and FIG. 7 show the COF for the friction plates of Example 1 and Example 2, respectively. These friction plates exhibit stable coefficient of friction throughout the entire engagement. This behavior continues well beyond 1000 engagement cycles indicating a durable friction performance.

Figure 8:
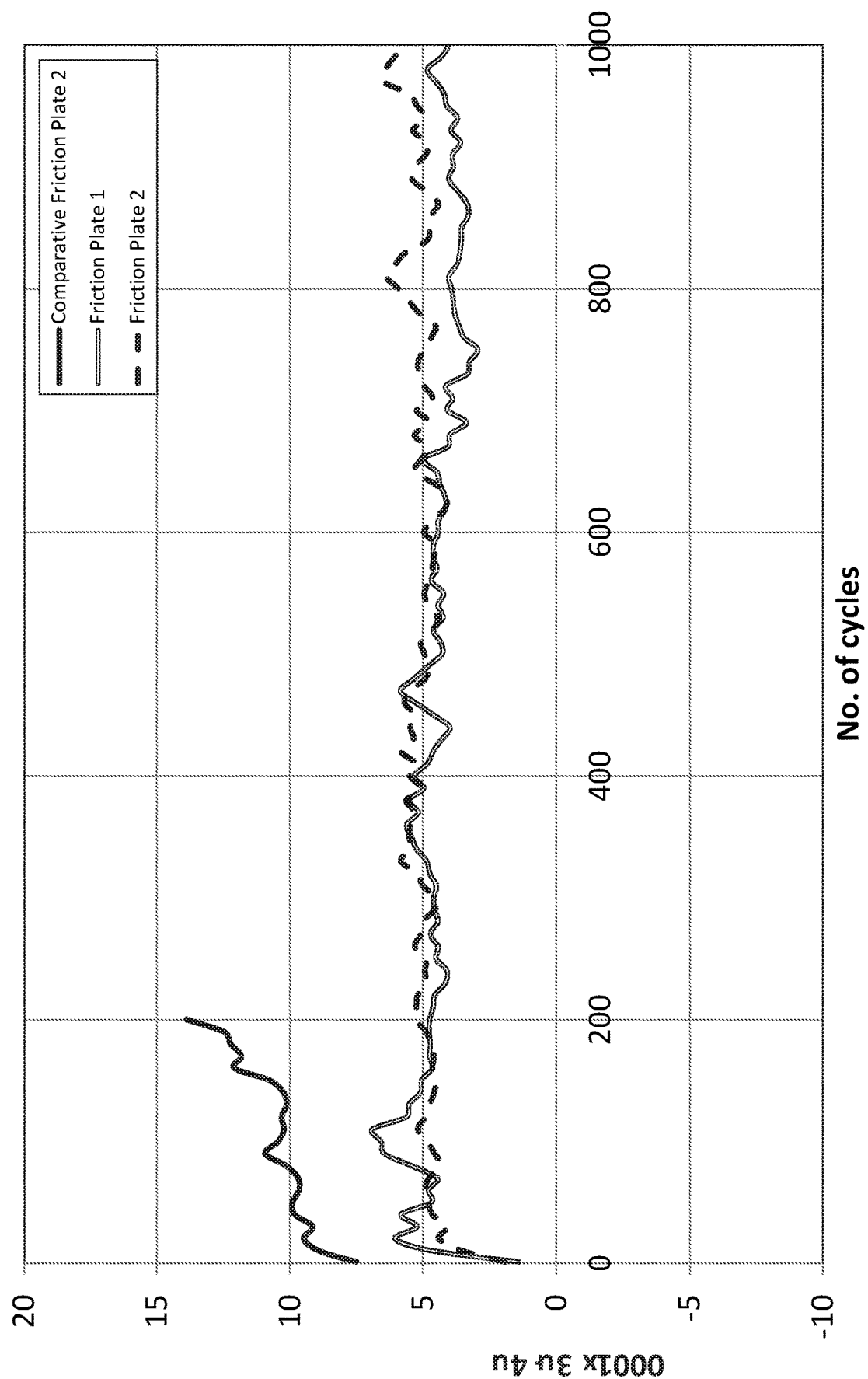
FIG. 8 is a line graph showing ($\mu 4$-$\mu 3$) values for the Friction Plates of Comparative Example 1, Example 1, and Example 2, wherein less positive values are preferred and are indicative of minimized shudder.

The results of these evaluations are then used to estimate shudder, as set forth in FIG. 8. In this Figure, $\mu 4$ represents the highest point at the end of the torque curve. $\mu 3$ represents the point in the torque curve at 10% of maximum RPM. If $\mu 4-\mu 3$ is a positive number, then shudder tends to occur. If $\mu 4-\mu 3$ is a negative number, then shudder most likely does not exist. In the instant evaluations, $\mu 4-\mu 3$ is a positive number for all evaluations. However, the number is smaller for friction plates of Examples 1 and 2 than the friction plate for Comparative Example 1. This is indicative of the superior performance of the friction plate for Examples 1 and 2 as compared to the friction plate for Comparative Example 1.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, ±30%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A friction material defining pores each having a pore size, wherein said friction material comprises:
   A. a base comprising;
      1. aramid fibers present in an amount of from 55 weight percent to 60 weight percent, based on a total weight of said base, and
      2. a filler present in an amount of from 40 weight percent to less than 45 weight percent, based on a total weight of said base;
   B. a deposit layer comprising a friction modifier; and
   C. a resin disposed throughout said friction material;
   wherein said friction material has a porosity of from 60% to 85% as determined using ASTM D4404-10;
      wherein said friction material has a median pore size of from 0.5 µm to 50 µm, as determined using ASTM D4404-10; and
      wherein said friction material is free of a material having a thermal degradation temperature of less than 200° C.

2. The friction material of claim 1 wherein said aramid is poly-paraphenylene terephthalamide.

3. The friction material of claim 1 wherein said material having a thermal degradation temperature of less than 200° C. is chosen from cotton, cellulose, and combinations thereof.

4. The friction material of claim 1 that is free of cotton.

5. The friction material of claim 1 wherein said base further comprises graphite in an amount of up to 20 weight percent based on a total weight of said base.

6. The friction material of claim 1 wherein said friction modifier is diatomaceous earth.

7. The friction material of claim 1 wherein said friction modifier is present in an amount of from 0.2 to 20 percent by weight based on a total weight of said base.

8. The friction material of claim 1 wherein said filler is diatomaceous earth.

9. The friction material of claim 1 wherein said resin is present in an amount of from 25 to 60 weight percent based on a total weight of said base and said deposit layer.

10. The friction material of claim 1 wherein said resin is a phenolic resin.

11. The friction materials of claim 1 wherein said resin is curable.

12. The friction material of claim 1 wherein said resin is cured.

13. The friction material of claim 1 wherein said base is a porous layer and particles of said friction modifier are disposed in said porous layer.

14. The friction material of claim 13 wherein said porous layer comprises a first outermost surface for exposure to the environment and a second outermost surface for adhesion to a metal plate, wherein said porous layer further defines an upper quadrant disposed closest to said first outermost surface and a lower quadrant disposed closest to said second outermost surface, and wherein said particles of said friction modifier are disposed in said upper quadrant of said porous layer.

15. The friction material of claim 1 wherein said friction material has a porosity of from 60% to 70% as determined using ASTM D4404-10.

16. The friction material of claim 1 wherein said friction material has a median pore size of from 8 µm to 15 µm, as determined using ASTM D4404-10.

17. A friction plate comprising a metal plate having at least two surfaces and said friction material of claim 1 bonded to at least one of said two surfaces.

18. A clutch assembly comprising the friction plate of claim 17 and a separator plate.

19. A transmission comprising the clutch assembly of claim 18.

20. A friction material defining pores each having a pore size, wherein said friction material comprises:
   A. a base comprising;
      1. aramid fibers present in an amount of from greater than 50 weight percent to 70 weight percent, based on a total weight of said base, and
      2. a filler present in an amount of from 30 weight percent to less than 50 weight percent, based on a total weight of said base;
   B. a deposit comprising a friction modifier; and
   C. a resin disposed throughout said friction material;
      wherein said friction material has a porosity of from 60% to 85% as determined using ASTM D4404-10;
      wherein said friction material has a median pore size of from 0.5 µm to 50 µm, as determined using ASTM D4404-10;
      wherein said friction material is free of a material having a thermal degradation temperature of less than 200° C.;
      wherein said base is a porous layer and particles of said friction modifier are disposed in said porous layer; and
      wherein said porous layer comprises a first outermost surface for exposure to the environment and a second outermost surface for adhesion to a metal plate, wherein said porous layer further defines an upper quadrant disposed closest to said first outermost surface and a lower quadrant disposed closest to said second outermost surface, and wherein said particles of said friction modifier are disposed in said upper quadrant of said porous layer.

* * * * *